Patented Aug. 27, 1929.

1,726,171

UNITED STATES PATENT OFFICE.

WILLIAM H. WILLIAMS AND JOSEPH W. BRITTON, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING ANILINE AND OTHER ARYLAMINES.

No Drawing. Application filed April 21, 1927. Serial No. 185,648.

Various attempts have been made to prepare arylamines from the corresponding halogenated aromatic hydrocarbon derivatives by direct reaction between the latter and ammonia at an elevated temperature and corresponding high pressure but so far as we are aware no commercial success has attended efforts heretofore made along this line. In the main such failure may be attributed to inability to secure a proper yield of the desired end product, so that the process is unprofitable. In certain cases where a relatively high yield has been obtained it has been found upon trial that the reacting mixture has such a destructive effect on the containers or apparatus in which the process is conducted as to render such processes impracticable.

In our application filed March 1, 1926, Serial No. 91,565, we disclose a method more particularly directed to the preparation of aniline or phenylamine $C_6H_5.NH_2$ from the corresponding halogenated benzene e. g. chlorobenzene, by a process of the general type described above wherein the reaction is greatly promoted and a much higher yield of aniline obtained by the addition to the reaction mixture of certain ingredients. This method or process, it may be stated, has proven entirely practicable when operated on a commercial scale, not only in the respects noted, but also in the important particular that the expensive apparatus required for carrying out such a high pressure high temperature reaction has been found unaffected by the reaction mixture after a considerable period of use. We have now further extended our investigation of this improved process and find in the first place that it is applicable generally to the preparation of arylamines i. e. is not limited in any sense to the preparation of aniline specifically; furthermore certain modifications and improvements in the procedure have been discovered which add measurably to the ease and smoothness of operation.

The present improved process accordingly consists of the steps hereinafter fully described and particularly pointed out in the claims; the following description setting forth but several of the various ways in which the principle of the invention may be used.

The following is given as a specific example of the procedure involved in carrying out our improved method or process for the making of aniline viz:—

In starting the operation a suitable quantity of chlorobenzene is mixed with a 25 to 30 per cent aqueous ammonia solution in such amount as to furnish from 4 to 5 mol. of anhydrous ammonia to one mol. of chlorobenzene. This mixture is then charged with from 0.1 to 0.2 mol. of cuprous oxide, hydroxide, or chloride, or a mixture thereof, (the cuprous oxide or hydroxide being preferred) into a suitable closed reaction chamber, such as an iron autoclave capable of withstanding a working pressure as high as several thousand pounds, and the mixture thereupon heated with stirring to a temperature of from 150 to 250 degs. C. and with a corresponding pressure viz, from 500 to 1500 pounds. The time of heating will vary with the temperature and pressure thus applied from 12 hours for the lower temperature to from 4 to 5 hours at the higher temperature.

The general reaction that occurs may be represented by the following equation, viz:—

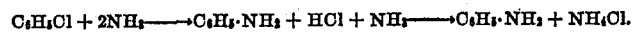

A certain amount of phenol will be simultaneously formed by hydrolysis of the chlorobenzene, but this is limited or controlled by the excess of ammonia employed. A small amount of diphenylamine,

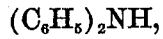

is also formed as a side product; while the excess ammonia will remain of course, as well as any unreacted chlorobenzene. In addition to reacting with the latter, the ammonia and ammonium chloride react with the cuprous oxide, hydroxide, or chloride introduced into the reaction mixture as aforesaid to yield certain copper-ammoniacal compounds that are of special significance and interest in the present connection.

It is quite important that air be prevented from coming in contact with the reaction mixture and to this end the autoclave should be initially filled with ammonia gas and an atmosphere of ammonia thereafter maintained, as the operation described is repeated.

Upon completion of the reaction in the first or main stage of the operation, the products still in the form of a liquid mixture resulting therefrom are discharged under pressure of the ammonia gas in the autoclave into a suitable closed vessel for removal first of the free ammonia and then for the treatment of the other ingredients in such mixture as will now be described. These ingredients will include the aniline oil containing unreacted chlorobenzene with some phenol as well as some diphenylamine; also the water from the aqueous solution of ammonia which will contain ammonium chloride with any excess of ammonia present. There will also be dissolved in such aqueous solution and to a certain extent in the aniline oil the above-mentioned copper-ammoniacal compounds.

The treatment of the foregoing mixture of ingredients and products resulting from the reaction consists in the first place in the addition to the unseparated mixture of a caustic compound, using this term to include the oxide, hydroxide or equivalent compound of an alkaline-earth metal as well as an alkali metal. Such caustic compound may be added (a) in an amount approximately just sufficient to liberate the ammonia from the ammonium chloride present in the mixture, or (b) in an amount sufficient in addition to the foregoing to react with the phenol as well.

After treatment with the caustic composition the mixture is next subjected to steam distillation with the result that (a) where only the ammonia has been freed, the following products will be distilled off in the order stated, viz: such ammonia, chlorobenzol, aniline and phenol (together) and diphenylamine, or (b) where enough caustic compound has been added to react with the phenol the following products will be distilled off in the order stated, viz: ammonia, chlorobenzol, aniline and diphenylamine, the phenate formed by reaction of the caustic compound with the phenol remaining in solution. In either case there will also remain in the solution a precipitate which settles out in the form of a sludge, such precipitate resulting from the reaction of the caustic compound with the aforesaid copper compounds. While the base of this precipitate or sludge is undoubtedly copper oxide, or hydroxide, its exact composition has not been ascertained, but after settling it is filtered and if desired may be washed with water, steamed or blown with air, but not too thoroughly dried in air, and is then used over again in a repetition of the process, being substituted for the cuprous chloride, oxide, or hydroxide previously specified. In case, however, there is a loss in copper, as may be determined by analysis, the deficiency may if desired be made up by adding more cuprous oxide or chloride to form the equivalent of that used in starting the process.

In conclusion it should be stated that our improved process is applicable not merely to aniline or phenylamine, $C_6H_5.NH_2$, but to the production of the homologues of aniline or the various arylamines in general, as illustrated by the following examples, viz:—

1. Dichlorobenzene, $C_6H_4Cl_2$, with ammonium cuprous chloride and copper, readily yields $C_6H_4(NH_2)_2$, phenylene-diamine.
2. Chlorotoluene, $CH_3C_6H_4Cl$, similarly yields $CH_3C_6H_4NH_2$, toluidine.
3. Chloronaphthalene, $C_{10}H_7Cl$, similarly yields $C_{10}H_7NH_2$, naphthylamine.
4. Chloroanthraquinone, $C_{14}H_7O_2Cl$, similarly yields $C_{14}H_7O_2NH_2$, amino-anthraquinone.

Certain of the foregoing homologues of aniline or equivalent arylamines it should further be explained may not be separable by dry distillation but in such case separation may be effected by an extraction process using chlorobenzene or equivalent solvent.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method of making an arylamine, the steps which consist in reacting between the corresponding halogenated aromatic hydrocarbon and aqueous ammonia solution in the presence of a cuprous compound, whereby a mixture of arylamine and an aqueous solution containing various copper compounds is produced, adding a caustic compound to such mixture, and then distilling.

2. In a method of making an arylamine, the steps which consist in reacting between the corresponding halogenated aromatic hydrocarbon and aqueous ammonia solution in the presence of a cuprous compound, whereby a mixture of arylamine and an aqueous solution containing various copper compounds is produced, adding a caustic compound to such mixture, then distilling, whereby the volatile products are carried off leaving a precipitate of such copper compounds behind, and repeating the first step, using such precipitate for the cuprous compound therein.

3. In a method of making an arylamine, the steps which consist in reacting between the corresponding halogenated aromatic hydrocarbon and aqueous ammonia solution in the presence of a cuprous compound, whereby a mixture of arylamine and an aqueous solution containing various copper compounds is produced, such mixture also including ammonium halide and a phenol, adding a caustic compound in amount sufficient to react with such halide, but not with such phenol and then distilling, whereby the more volatile products including such phenol are separated from such solution.

4. In a method of making an arylamine, the steps which consist in reacting between the corresponding halogenated aromatic hydrocarbon and aqueous ammonia solution in the presence of a cuprous compound, whereby a mixture of arylamine and an aqueous solution containing various copper compounds is produced, such mixture also including ammonium halide and a phenol, adding a caustic compound in amount sufficient to react with such halide, but not with such phenol and then distilling, whereby the more volatile products including such phenol are separated from such solution, leaving a precipitate of such copper compounds behind, and repeating the first step, using such precipitate for the cuprous compound therein.

5. In a method of making aniline, the steps which consist in reacting between a halogentated benzene and aqueous ammonia solution in the presence of a cuprous compound, whereby a mixture of aniline and an aqueous solution containing various copper compounds is produced, adding a caustic compound to such mixture and then distilling.

6. In a method of making aniline, the steps which consist in reacting between a halogenated benzene and aqueous ammonia solution in the presence of a cuprous compound, whereby a mixture of aniline and an aqueous solution containing various copper compounds is produced, adding a caustic compound to such mixture, then distilling, whereby the more volatile products are carried off leaving a precipitate of such copper compounds behind, and repeating the first step, using such precipitate for the cuprous compound therein.

7. In a method of making aniline, the steps which consist in reacting between a halogenated benzene and aqueous ammonia solution in the presence of a cuprous compound, whereby a mixture of aniline and an aqueous solution containing various copper compounds is produced, such mixture also including ammonium halide and phenol, adding a caustic compound in amount sufficient to react with such halide but not with such phenol and then distilling, whereby the more volatile products including such phenol are separated from such solution.

8. In a method of making aniline, the steps which consist in reacting between a halogenated benzene and aqueous ammonia solution in the presence of a cuprous compound, whereby a mixture of aniline and an aqueous solution containing various copper compounds is produced, such mixture also including ammonium halide and phenol, adding a caustic compound in amount sufficient to react with such halide but not with such phenol and then distilling, whereby the more volatile products including such phenol are separated from such solution, leaving a precipitate of such copper compounds behind, and repeating the first step, using such precipitate for the cuprous compound therein.

9. In a method of making aniline, the steps which consist in reacting between chlorobenzene and aqueous ammonia solution in the presence of cuprous oxide, whereby a mixture of aniline and an aqueous solution containing various copper compounds is produced, adding a caustic compound to such mixture and then distilling off the aniline.

10. In a method of making aniline, the steps which consist in reacting between chlorobenzene and aqueous ammonia solution in the presence of cuprous oxide, whereby a mixture of aniline and an aqueous solution containing various copper compounds is produced, adding a caustic compound to such mixture and then distilling off the aniline, a precipitate of such copper compounds being left behind, and repeating the first step, using such precipitate for the cuprous oxide therein.

11. In a method of making aniline, the steps which consist in reacting between chlorobenzene and aqueous ammonia solution in the presence of cuprous oxide, whereby a mixture of aniline and an aqueous solution containing various copper compounds is produced, such mixture also including ammonium chloride and phenol, adding a caustic compound to such mixture, distilling off ammonia, aniline and phenol, separating the two last named compounds, a precipitate of such copper compounds being left behind, and repeating the first step, using such precipitate for the cuprous oxide therein.

Signed by us this 1st day of April, 1927.

WILLIAM H. WILLIAMS.
JOSEPH W. BRITTON.